(12) United States Patent
Litwin et al.

(10) Patent No.: US 8,441,914 B2
(45) Date of Patent: May 14, 2013

(54) CELL SEARCH FOR HANDOVER CONDITIONS

(75) Inventors: Louis Robert Litwin, Edison, NJ (US); Manoj Viswambharan, Morganville, NJ (US)

(73) Assignee: Thomson Licensing, Issy les Moulineaux (FR)

(*) Notice: Subject to any disclaimer, the term of this patent is extended or adjusted under 35 U.S.C. 154(b) by 1337 days.

(21) Appl. No.: 11/886,945

(22) PCT Filed: Mar. 28, 2005

(86) PCT No.: PCT/US2005/010141
§ 371 (c)(1),
(2), (4) Date: Sep. 24, 2007

(87) PCT Pub. No.: WO2006/104482
PCT Pub. Date: Oct. 5, 2006

(65) Prior Publication Data
US 2009/0036113 A1 Feb. 5, 2009

(51) Int. Cl.
*H04W 4/02* (2009.01)

(52) U.S. Cl.
USPC ........................... 370/208; 455/422.1

(58) Field of Classification Search ........... 370/208, 370/350, 206; 375/142, 150, 329, 343, 320; 455/67.11, 422.1; 342/357.25, 458
See application file for complete search history.

(56) References Cited

U.S. PATENT DOCUMENTS

| | | | |
|---|---|---|---|
| 5,898,926 A | | 4/1999 | Konishi |
| 2001/0040884 A1* | | 11/2001 | Bouquier et al. ............. 370/350 |
| 2003/0193926 A1* | | 10/2003 | Lindoff et al. ................ 370/350 |
| 2003/0202541 A1 | | 10/2003 | Lim et al. |
| 2004/0057468 A1 | | 3/2004 | Shieh et al. |
| 2004/0228268 A1* | | 11/2004 | McDonough et al. ........ 370/208 |

FOREIGN PATENT DOCUMENTS

| | | |
|---|---|---|
| JP | 09284826 | 10/1997 |
| JP | 2002204182 | 7/2002 |
| WO | WO2005018104 | 2/2005 |

OTHER PUBLICATIONS

Tanno, M., "Experiments on Three-Step Fast Cell Search Algorithm Employing Common Pilot Channel . . . ", Vehicular Technology Conference, Sep. 26, 2004, XP010786766, pp. 968-973.
TSG-RAN Working Group 1 Meeting, "Physical Layer Procedures TS25.214 v. 1.0.0", Apr. 22, 1999, XP002270233, p. 6.
International Search Report, dated Nov. 23, 2005.

* cited by examiner

*Primary Examiner* — Kiet Doan
(74) *Attorney, Agent, or Firm* — Robert D. Shedd; Jeffrey M. Navon; Catherine A. Cooper

(57) ABSTRACT

A method and apparatus for controlling a primary cell search operation including generating a profile of correlation peaks, determining if magnitudes of the correlation peaks vary, synchronizing a signal acquisition process to one of the identified correlation peak having a greatest magnitude if the magnitudes of the correlation peaks remain relatively constant and synchronizing the signal acquisition process to a peak whose magnitude is increasing if the magnitudes of the correlation peaks are changing. The method and apparatus further include identifying an index and a magnitude of a largest correlation peak of the correlation peaks, determining if other correlation peaks exist in the profile, synchronizing the signal acquisition process to the largest correlation peak originally identified if other correlation peaks do not exist, storing indices and magnitudes for all other correlation peaks located and comparing changes in correlation peak magnitudes for all previously identified peaks.

10 Claims, 4 Drawing Sheets

CELL SEARCH FOR HANDOVER CONDITIONS

This application claims the benefit, under 35 U.S.C. §365 of International Application PCT/US2005/010141, filed 28 Mar. 2005, which was published in accordance with PCT Article 21(2) on 5 Oct. 2006, UN No. WO 2006/104482 in English.

FIELD OF THE INVENTION

The present invention relates to handover conditions in a carrier based system and, in particular, to the primary cell search process.

BACKGROUND OF THE INVENTION

The basic unit of time in UMTS radio signals is a 10 milli-second (ms) radio frame, which is divided into 15 slots of 2560 chips each. UMTS radio signals from a cell (or base station) to a UMTS receiver are "downlink signals," while radio signals in the reverse direction are termed "uplink signals."

The physical layer of the universal mobile telecommunication system (UMTS) wideband code-division multiple access (WCDMA) standard uses direct sequence spread spectrum (DSSS) modulation with a chip rate of 3.84 Mcps. The frequency division duplex (FDD) mode carries the uplink and the downlink channels on separate frequency bands of 5 MHz each. This mode is typically used for large outdoor cells because it can support a larger number of users than time division duplex (TDD) mode. In TDD mode, the transmissions share the same uplink and downlink channels during different time slots. The TDD mode does not support as many users as the FDD mode, and hence, TDD mode is more suitable for smaller cells. TDD mode is also more suited for carrying asymmetric traffic compared to FDD mode.

An important procedure performed by a receiver within a UMTS network, for example a CDMA mobile receiver, is the cell search operation. Cell searching typically is performed by a cell search system that is incorporated as part of the receiver. The cell search system is activated after the receiver is powered on to determine synchronization information pertaining to the cell in which the receiver is located. The cell search operation is a three-stage process. That is, the cell search system performs slot synchronization (primary synchronization), frame synchronization and scrambling code group determination (secondary synchronization), and scrambling code determination.

After power-up, the mobile terminal (MT) has to perform several operations before voice/data communications can begin. First, the receiver needs to implement automatic gain control (AGC) in order to scale the received signal power and prevent clipping at the analog-to-digital converter. This process first can be performed on the synchronization channel (SCH) and later the descrambled common pilot channel (CPICH) can be used once the cell's scrambling code is acquired.

Next the receiver needs to acquire timing synchronization. Timing synchronization can be achieved from the SCH channel. The MT searches for the strongest SCH signal that it can find and that signal determines with which cell the MT will initiate communications. Since the SCH channel is periodic, the receiver can correlate against the primary SCH to derive a timing error. Based on this channel, the receiver can achieve chip, symbol and slot synchronization.

The primary SCH carries the same signal for all cells in the system. The secondary SCH is different for each cell and carries a pattern of secondary synchronization codes (SSCs) that repeat every frame. Once the MT receives this sequence, it will have frame synchronization.

In performing cell searching, the cell search system accesses a synchronization channel (SCH) and a common pilot channel (CPICH) of the received wireless signal. The SCH is a composite channel formed from a primary SCH and a secondary SCH. Within each slot, the primary SCH specifies a primary synchronization code (PSC). The primary SCH, however, only contains data during the first 256 chips of each 2560 chip slot. As is known, "chip" or "chip rate" refers to the rate of the spreading code within a CDMA communication system.

In addition, the pattern identifies which scrambling code group the current cell's scrambling code belongs to. There are 64 scrambling code groups and each group contains eight scrambling codes. Once the MT has determined the current cell's scrambling code group, the search for the current cell's scrambling code is narrowed to the eight codes in that group.

The typical acquisition process for a carrier based receiver is as follows:
1. Primary Cell Search
2. Secondary Cell Search
3. Scrambling Code Determination
4. Multipath Searching
5. Finger Assignment
6. Locking of Code Tracking and Automatic Frequency Control (AFC) loops
7. Maximal Ratio Combining (MRC) of finger output
8. Receiver lock is acquired and data can be sent to upper layers This acquisition process is long and involved and can take on the order of several seconds to complete. This waiting period is annoying for the cell phone/mobile station/mobile device user when he/she turns on his/her phone and a method for shortening the acquisition process is clearly desirable.

EP1179962 entitled "Mobile station handover method for asynchronous wireless telecommunication system, involves switching between USTS and non-USTS modes, based on ratio of power intensities of pilot signals of current and adjacent cells" by J. Cho et al. describes a method of switching between an uplink synchronous transmission scheme (USTS) and a non-USTS mode based on the ratio of power intensities between a current cell and adjacent cell. The method is used for handover of a mobile station in a wireless telecommunication system and to increase data transmission rate based on the compressed mode. The method described by Cho et al. is not directed to a cell search and the ratio of pilot power intensities that are described and used by Cho et al. vary from cell to cell. The ratio of power intensities can be determined based on a snapshot of the correlation data (an instant of time).

SUMMARY OF THE INVENTION

The present invention enhances the cell search process of a carrier based receiver. While the present invention will hereinafter be described with respect to a 3G WCDMA receiver, it is understood that the present invention is applicable to any carrier based system.

The control logic block controls the Primary Cell Search when the cellular receiver is in a handoff scenario (e.g., within communication range of two or more cell towers). The largest peak is identified and a search is performed for other peaks. If only one peak is above the threshold, the receiver's 8-step acquisition process is performed by synchronizing the receiver to that peak. However, if multiple peaks are identified, then Control Logic reruns Primary Cell Search for X iterations and keeps track of the changes in each peak's magnitude. The Control Logic then identifies the peak whose magnitude is increasing the most (representing the cell tower that the cell phone/mobile station/mobile device is moving towards). The receiver's 8-step acquisition process is performed by synchronizing the receiver to the peak whose magnitude is increasing the most.

A method and apparatus for controlling a primary cell search operation including generating a profile of correlation peaks, determining if magnitudes of the correlation peaks vary, synchronizing a signal acquisition process to one of the identified correlation peak having a greatest magnitude if the magnitudes of the correlation peaks remain relatively constant and synchronizing the signal acquisition process to a peak whose magnitude is increasing if the magnitudes of the correlation peaks are changing, is described. The method and apparatus further includes identifying an index and a magnitude of a largest correlation peak of the correlation peaks, determining if other correlation peaks exist in the profile, synchronizing the signal acquisition process to the largest correlation peak originally identified if other correlation peaks do not exist, storing indices and magnitudes for all other correlation peaks located and comparing changes in correlation peak magnitudes for all previously identified peaks.

BRIEF DESCRIPTION OF THE DRAWINGS

These and other aspects, features and advantages of the present invention will become apparent from the following detailed description of preferred embodiments, which is to be read in connection with the accompanying drawings. Finally, like-numbers on the figures represent similar elements.

DETAILED DESCRIPTION OF THE PREFERRED EMBODIMENTS

In the following description, familiarity with UMTS-based wireless communications systems is assumed and is not described in detail herein. For example, knowledge regarding spread spectrum transmission and reception, cells (base stations), user equipment (UE), downlink channels, uplink channels and RAKE receivers is assumed and not described herein. In addition, the invention may be implemented using conventional programming techniques, which, as such, will not be described herein.

The specific problem addressed by the present invention is how to reduce acquisition time during the common situation where the phone is located within communications range of two or more cell towers (i.e., a handoff scenario).

The current approach in the prior art is to perform the 8-step acquisition process described above. When this occurs during a handoff scenario, the phone might begin the acquisition process (e.g., cell search) using the signal from the nearest base station (since it appears as the strongest peak at the receiver). However, if the phone is moving away from the base station, by the time the 8-step acquisition process finishes, the peak might be so low or non-existent that lock fails and the entire 8-step acquisition process must be restarted using the signal from a different cell tower.

The acquisition process takes time to do once—doing it twice takes even longer. A method for "doing it right the first time" would be desirable in terms of user experience.

Figure 1:
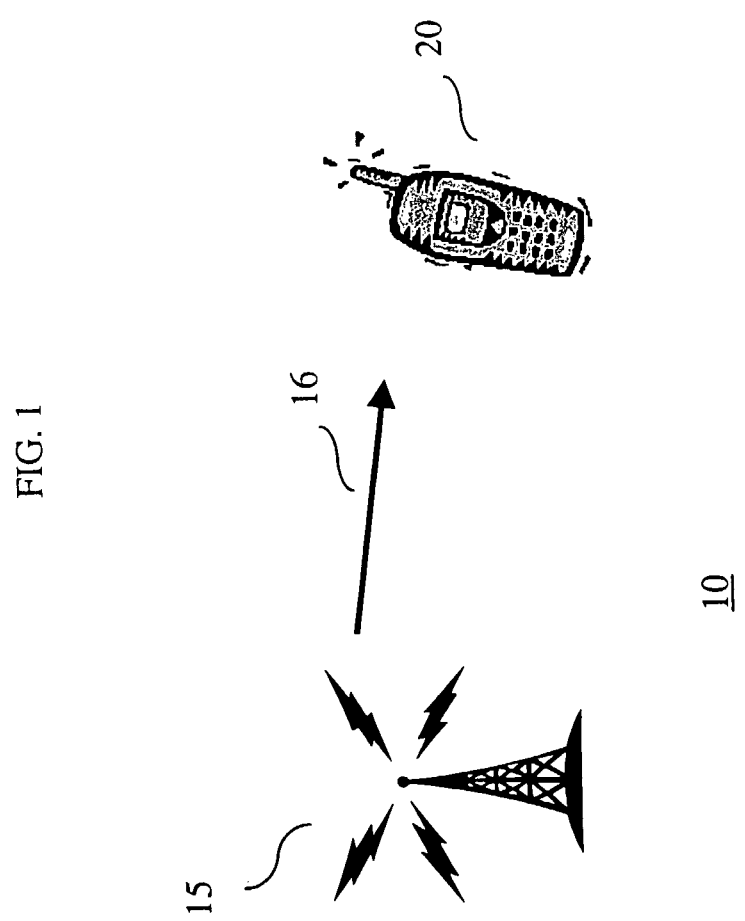
FIG. 1 shows a portion of an illustrative wireless communications system in accordance with the principles of the present invention.

An illustrative portion of a UMTS wireless communications system 10 in accordance with the principles of the invention is shown in FIG. 1. Cell (or base station) 15 broadcasts a downlink synchronization channel (SCH) signal 16 including the above-mentioned PSCH and SSCH subchannels. As noted earlier, the SCH signal 16 is used by UMTS User Equipment (UE) for synchronization purposes as a precondition to voice/data communications. For example, the UE processes the SCH signal during a "cell search" operation. In this example, UE 20, e.g., a cellular phone, initiates a cell search when, e.g., UE 20 is turned on, or powered up. The purposes of the cell search operation include (a) synchronization to cell transmissions at the slot and frame level of the UMTS radio frame, and (b) determination of the scrambling code group of the cell (e.g., cell 15). As described below, and in accordance with the principles of the invention, UE 20 adaptively controls the duration of processing of the SSCH portion of the SCH for determining frame synchronization. It should be noted that although the following examples illustrate the inventive concept in the context of this initial cell search, i.e., when UE 20 is turned on, the inventive concept is not so limited and is applicable to other instances of the cell search, e.g., when the UE is in an "idle mode."

Figure 4:
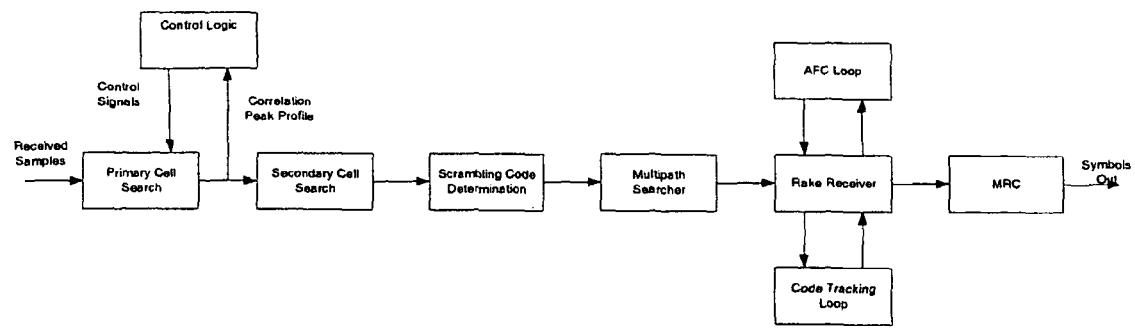
FIG. 4 is a block diagram of the acquisition process of the present invention for a carrier based receiver.

Aspects of the present invention are embodied in the control logic block indicated in FIG. 4. The control logic implements the logic described by the flow chart in FIGS. 5A and 5B. First, an initial primary cell search step is run and the correlation peak profile is examined to locate the index and magnitude of the largest peak. After identifying the largest peak (the "original" peak), the remainder of the correlation peak profile is scanned to identify other peaks that are more than M samples away from the original peak and that have a magnitude of greater than or equal to N % of the original peak. M and N are design parameters that are determined by simulation or are adaptive parameters, e.g., M=4 and N=80%. The M samples dead zone is used because the peaks will actually have a sinc-function shape and samples very close to the main/original peak are due to the main peak itself and do not represent a separate peak. The N % magnitude threshold is used in order to isolate only the strong peaks, which represent signal energy from base stations that are close enough for the receiver such that the receiver can lock onto those base stations.

Figure 2:
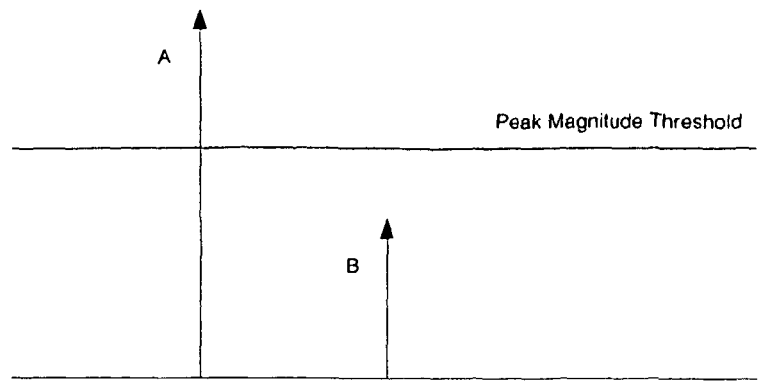
FIG. 2 shows a single significant peak (Peak A) and a second peak (Peak B) whose magnitude is below the N % threshold.

FIG. 2 shows the case of a single significant peak (Peak A) and a second peak (Peak B) whose magnitude is below the N % threshold. When this case occurs, the remaining 8-step acquisition process is performed by synchronizing the receiver to Peak A.

Figure 3:
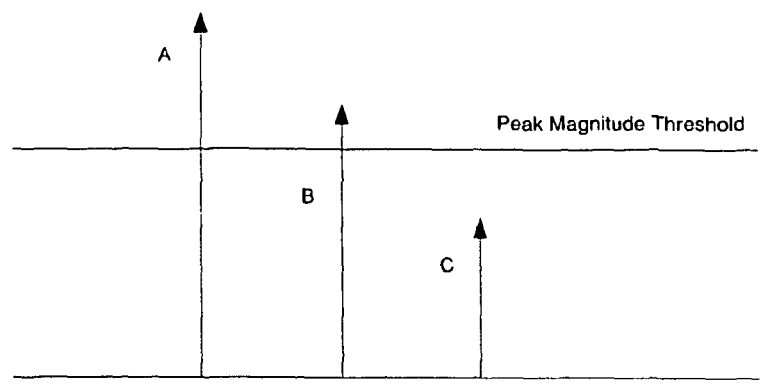
FIG. 3 shows three peaks, where peak A is a significant peak, peak B is a second significant peak whose threshold is above the N % threshold and peak C is a third peak, whose threshold is below the N % threshold.

Another aspect of the present invention is when the situation shown in FIG. 3 occurs. In FIG. 3, peak A is the original peak. There is, however, a second peak (peak B), which is also above the N % threshold. Peak C is also present on FIG. 3 but the magnitude of peak C has not exceeded the N % threshold. In this situation, the present invention's control logic block behaves as follows. It notes the index and magnitude of peak A and peak B and it reruns primary cell search X times (X is a design parameter, e.g., X=10). The change in magnitude, if any, is noted for each iteration of the primary cell search. If the magnitudes of peak A and peak B are relatively constant, then the remainder of the 8-step acquisition process is performed by synchronizing the receiver with peak A. This would correspond to a scenario where the user's phone/mobile station is not moving perceptibly.

However, if the magnitudes of peak A and peak B are changing, it indicates that the user's phone/mobile station is moving. The described arrangement determines towards which cell tower the mobile station is moving—the one corresponding to peak A or the one corresponding to peak B. For example, if the magnitude of peak B is increasing and the magnitude of peak A is decreasing, it indicates that the phone is moving towards cell tower B and away from cell tower A. Hence the 8-step acquisition process should be performed by synchronizing the receiver to peak B, even if peak B is lower in magnitude than peak A. The algorithm examines all relevant peaks (i.e., those above the threshold) and runs the 8-step acquisition process by synchronizing to the peak whose magnitude is increasing the most.

Had there been additional peaks that exceeded the N % threshold then the receiver would be synchronized to the peak that was increasing the most not the peak with the largest magnitude. For example, had peaks B and C both exceeded the N % threshold and peak C been of a lesser magnitude than peak B but peak C's magnitude been increasing more then the receiver would be synchronized to peak C.

FIG. 4 is a block diagram of the acquisition process of the present invention for a carrier based receiver. The control logic of the present invention takes place after the primary cell search is run/executed and before the secondary cell search is run/executed. The control logic is executed/run multiple times (iterated). The number of iterations of the control logic process is a design parameter, which is determined based on simulations, or is an adaptive parameter.

Figure 5A:
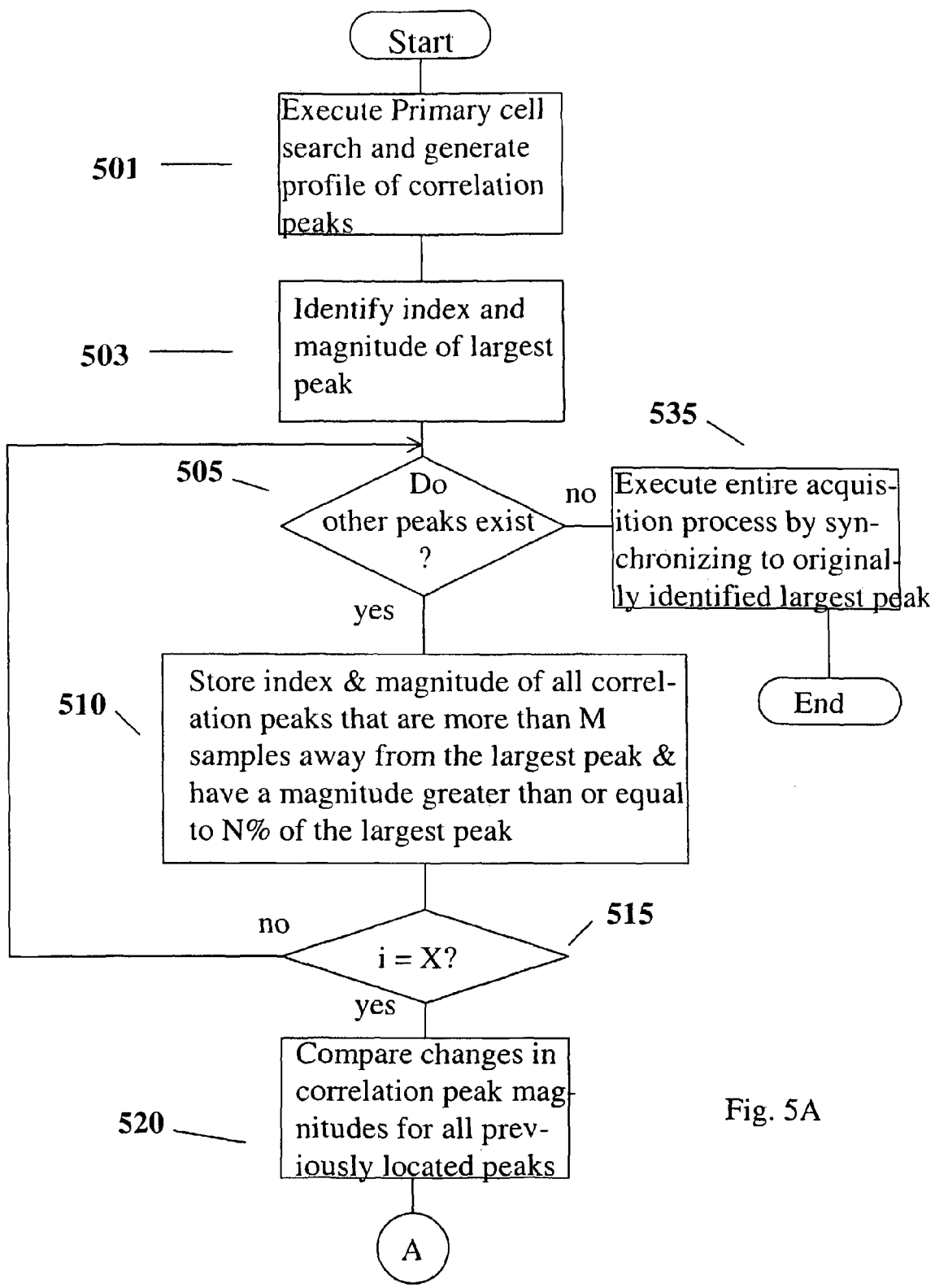
FIG. 5A is a flowchart of the control logic portion of the block diagram of FIG. 4.
Figure 5B:
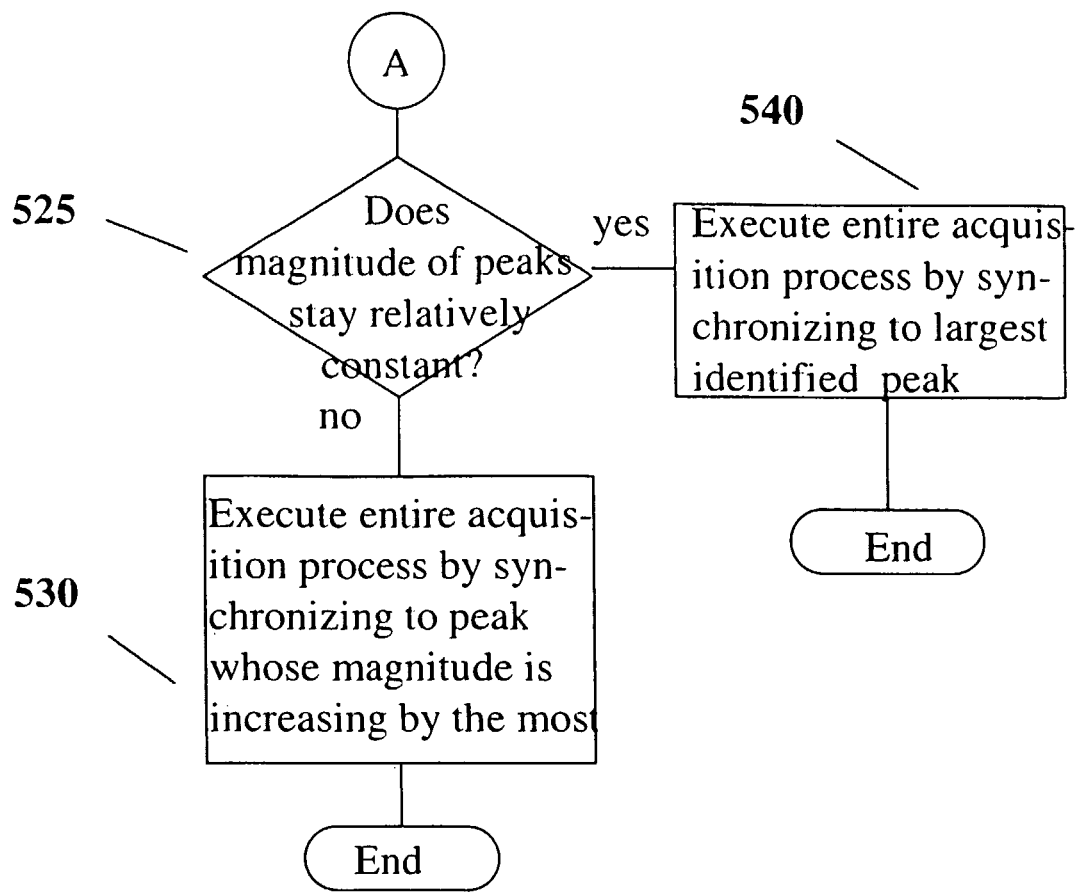
FIG. 5B is a continuation of FIG. 5A.

FIGS. 5A and 5B are together a flowchart of the control logic portion of the block diagram of FIG. 4. The primary cell search is run/executed at 501 and a profile of correlation peaks is generated. The index and magnitude of the largest peak are identified at 503. A test is made at 505 to determine if other peaks exist more than M samples away from the largest peak identified in the primary cell search where the magnitude of any other peaks is determined to be greater than or equal to N % of the largest peak, where M and N are design parameters set based on simulations or are adaptive parameters. If the results of the test are negative then the remainder of the acquisition process is executed (secondary cell search forward) by synchronizing to the originally identified largest peak at 535. If the results of the test are positive then the index and magnitude of all correlation peaks that meet the above criteria are stored at 510. Another test is performed at 515 to determine if the number of iterations (i) equals X, where X is a design parameter that is set based on simulations or where X is an adaptive parameter. If X iterations have not been performed then control is returned to 505. If X iterations have been performed then changes in the correlation peak magnitudes are performed for all peaks previously identified at 520. Yet another test is performed at 525 to determine if the magnitudes of the correlation peaks remained relatively constant, which implies that the mobile station/device is not moving. If the magnitudes remained relatively constant then the remainder of the acquisition process is executed (secondary cell search forward) by synchronizing to the largest identified largest peak at 540. If the results of the test at 525 are negative then the entire acquisition process is executed at 530 (secondary cell search forward) by synchronizing to the peak whose magnitude is increasing by the greatest amount, which implies that the mobile station/device is moving towards the corresponding base station.

The control logic block controls the Primary Cell Search in order to improve performance and reduce acquisition time when the cellular receiver is in a handoff scenario (e.g., within communication range of two or more cell towers). The largest peak is identified and a search is performed for other peaks that are farther than M samples from the largest peak and whose magnitude is greater than or equal to N % of the magnitude of the largest peak. If only one peak is above the threshold, the receiver's 8-step acquisition process is performed by synchronizing the receiver to that peak. However, if multiple peaks are above the threshold, the Control Logic reruns Primary Cell Search for X iterations and keeps track of the changes in each peak's magnitude. The Control Logic then identifies the peak whose magnitude is increasing the most (representing the cell tower that the cell phone is moving towards). The receiver's 8-step acquisition process is performed by synchronizing the receiver to the peak whose magnitude is increasing the most.

It is to be understood that the present invention may be implemented in various forms of hardware, software, firmware, special purpose processors, or a combination thereof, for example, within a mobile terminal, access point, or a cellular network. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for controlling a cell search operation, said method comprising:
    generating a profile of correlation peaks;
    determining if magnitudes of said correlation peaks vary over time;
    synchronizing a signal acquisition process to one of said identified correlation peak having a greatest magnitude if said magnitudes of said correlation peaks remain relatively constant; and synchronizing said signal acquisition process to a peak whose magnitude is increasing if said magnitudes of said correlation peaks are changing, further comprising:

identifying an index and a magnitude of a largest correlation peak of said correlation peaks;

determining if other correlation peaks exist in said profile;

synchronizing said signal acquisition process to said largest correlation peak originally identified if other correlation peaks do not exist;

storing indices and magnitudes for all other correlation peaks located; and comparing changes in correlation peak magnitudes for all previously identified peaks.

2. The method according to claim 1, further comprising iterating a predetermined number of times to determine if other correlation peaks exist.

3. The method according to claim 1, further comprising storing said index and said magnitude of said correlation peaks greater than a predetermined number of samples away from said largest peak.

4. The method according to claim 1, further comprising storing said index and said magnitude of said correlation peaks greater than or equal to a predetermined percentage of said largest peak.

5. An apparatus for controlling a cell search operation, comprising:

means for generating a profile of correlation peaks;

means for determining if magnitudes of said correlation peaks vary over time;

means for synchronizing a signal acquisition process to one of said identified correlation peak having a greatest magnitude if said magnitudes of said correlation peaks remain relatively constant; and means for synchronizing said signal acquisition process to a peak whose magnitude is increasing if said magnitudes of said correlation peaks are changing, further comprising:

means for identifying an index and a magnitude of a largest correlation peak of said correlation peaks;

means for determining if other correlation peaks exist in said profile;

means for synchronizing said signal acquisition process to said largest correlation peak originally identified if other correlation peaks do not exist;

means for storing indices and magnitudes for all other correlation peaks located; and means for comparing changes in correlation peak magnitudes for all previously identified peaks.

6. The apparatus according to claim 5, further comprising means for iterating a predetermined number of times to determine if other correlation peaks exist.

7. The apparatus according to claim 5, further comprising means for storing said index and said magnitude of said correlation peaks greater than a predetermined number of samples away from said largest peak.

8. The apparatus according to claim 5, further comprising means for storing said index and said magnitude of said correlation peaks greater than or equal to a predetermined percentage of said largest peak.

9. The apparatus according to claim 5, wherein said apparatus is a receiver.

10. The receiver according to claim 9, wherein said receiver is a mobile terminal.

* * * * *